July 24, 1934.   F. E. WOLCOTT   1,967,983
COFFEE MAKER
Filed April 23, 1931
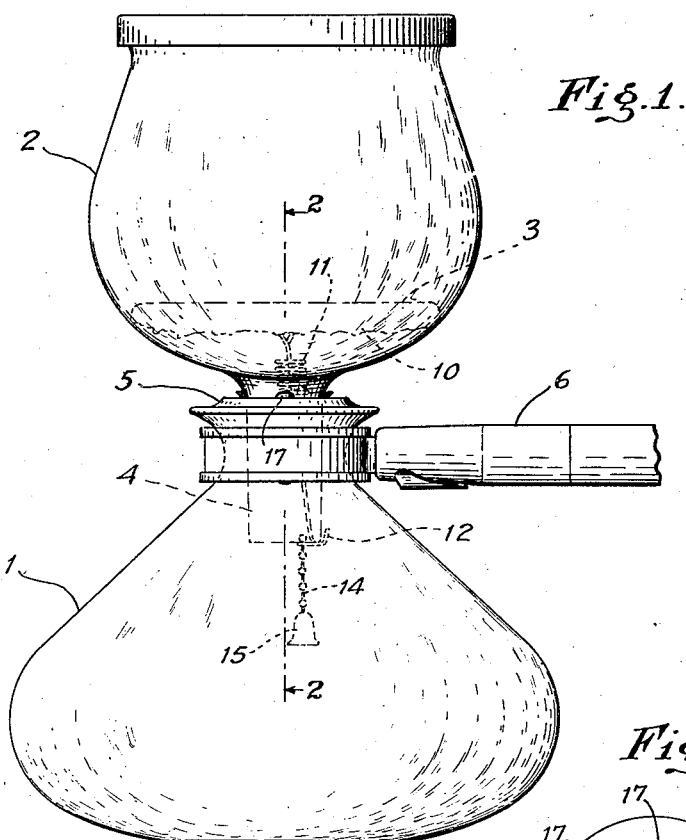
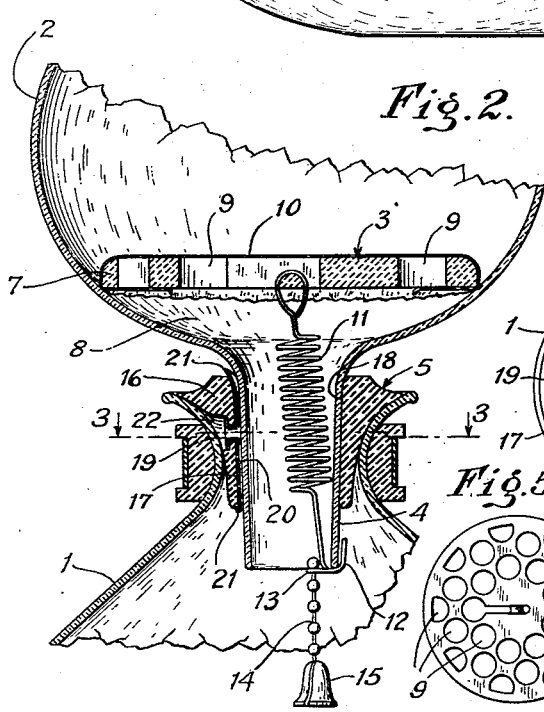
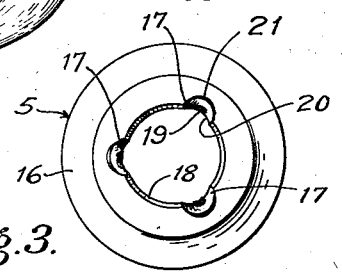
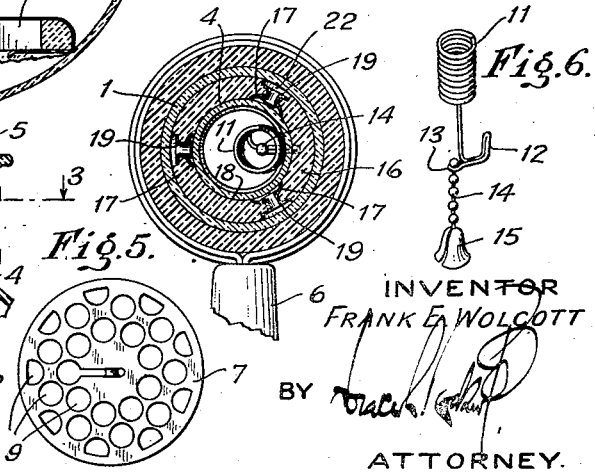
INVENTOR
FRANK E. WOLCOTT
BY
ATTORNEY.

Patented July 24, 1934

1,967,983

UNITED STATES PATENT OFFICE 1,967,983

COFFEE MAKER

Frank E. Wolcott, West Hartford, Conn., assignor to The Silex Company, a corporation of Connecticut Application April 23, 1931, Serial No. 532,249

22 Claims. (Cl. 53—3)

My invention relates to coffee makers.

It has among its objects to provide an improved coffee maker of the drip type, and more particularly, an improved construction whereby the process of making drip coffee is substantially expedited at the same time that a superior product is obtained and one also having a higher temperature. Other objects of my invention are to provide an improved construction whereby I am enabled to embody in a drip coffee maker certain of the advantageous features previously only obtainable in a glass coffee maker of the well known vacuum type, and more particularly, to provide an improved construction having a plurality of glass bowls including a removable upper bowl and a co-operating lower bowl also adapted to use as a pouring bowl upon removal of the upper bowl, and improved co-operating means whereby marked advantages are obtained as compared with previous coffee makers of the drip type. More specific objects of my invention are to provide improved lower and upper bowls co-operating in an improved manner, improved draining means, and also improved connecting and venting means between the bowls. These and other objects and advantages of my improved construction will, however, hereinafter more fully appear.

In the accompanying drawing, I have shown for purposes of illustration one embodiment which my invention may assume in practice.

In the drawing,—

Figure 1 is a side elevation of a coffee maker of my improved construction;

Fig. 2 is a partial vertical sectional view on line 2—2 of Figure 1;

Fig. 3 is a transverse sectional view on line 3—3 of Fig. 2;

Fig. 4 is a top view of the venting member;

Fig. 5 is a plan view of the strainer disc somewhat reduced in size; and

Fig. 6 is a detail view of the lower end of the spring connection.

In this illustrative construction I have shown my improved drip coffee maker as having improved bowls comprising a lower bowl 1 and an upper bowl 2 mounted therein, and improved strainer means, generally indicated at 3, disposed in the upper bowl 2, while the stem 4 on the latter bowl is seated in an improved combined washer and vent 5, and a suitable handle 6 is connected to the restricted neck of the lower bowl 1, the various parts being improved and co-operating in a new and improved manner as hereinafter described.

Referring more particularly to the bowls, these are preferably of glass and adapted to be disposed in the relation shown in Figure 1 during the coffee making process, with the ground coffee and hot water inserted in the bowl 2 and the finished coffee draining therefrom into the lower bowl 1. Moreover, it will be understood that after the completion of the drip process, the bowl 2 and the member 5 are removed and that the bowl 1 is thereafter used as a serving or pouring bowl, being very conveniently handled by reason of the handle 6, which thus serves as a handle for the complete coffee maker and for the pouring bowl after the coffee is made.

Referring more particularly to the upper bowl, it will be noted that the same herein is provided with a short stem 4 which extends only slightly below the neck of the bowl 1, as distinguished from to a point closely adjacent the bottom of the bowl 1, as in coffee makers of the vacuum type. Moreover, it will be noted that improved strainer mechanism is disposed in the bottom of the bowl 2. More particularly the same includes a strainer disc 7, herein as preferably of porcelain, and of such enlarged diameter that it is supported on the sloping bottom of the bowl 2 at a substantial distance above the upper end of the stem 4 in such manner as to provide a large chamber 8 between the same and the upper end of the neck having free communication with the neck. Moreover, it will be noted that this disc member 7 is provided with a large number of vertical openings or apertures 9 therein, which are so distributed over its surface as to permit a free and quick flow of liquid through the same and into the space 8. Herein it will also be noted that the disc 7 is enclosed in a suitable filter cloth 10 acting as a filter for the coffee placed in the bowl 2. As shown, the disc 7 is also axially connected by a suitable spring 11 to the lower edge of the stem 4 in such manner as to hold it securely in position at the bottom of the bowl 2, while being readily releasable from the bottom of the stem. As shown, the spring 11 is provided with a coiled portion intermediate its ends and a clip portion 12 on its lower end formed by bending the elongated lower end of the spring laterally and upwardly and then reversely in such manner as to provide a doubled section having an extension 13 disposed below and nearer the axis of the spring and herein carrying a flexible pull or actuating connection 14 for the spring, preferably in the form of a chain having an end gripping member 15 thereon.

Thus it will be observed that whenever the disc 7 with its filter cloth thereon, is placed in position in the bottom of the bowl 2, it may be fastened therein by pulling down on the member 15 in such manner as to cause the clip 12 to engage the bottom of the stem 4 and thereby hold the disc securely in position, while providing for a quick, free flow of the liquid into the lower bowl 2. Moreover, it will be noted that the disc 7 may be readily released whenever desired by simply pulling down on the member 15 until the clip 12 clears the bottom of the stem and then releasing the member 15, whereupon the disc may be readily removed.

Operatively associated with the mechanism so far described is the improved combined washer and vent member 5. This herein, as preferably, includes a resilient member 16, herein of soft and quite pure rubber, and adapted to seat in the neck of the bowl 1 and having an axial aperture adapting it to be normally carried on the upper end of the stem 4. In my present construction this member, while preventing objectionable contact between the two bowls, also constitutes an improved vent having improved venting means for the bowl 1. More particularly, it will be noted that a plurality of vent members, herein indicated at 17, are disposed in spaced relation longitudinally of an axial aperture 18 in the member 16 and suitably attached to the latter intermediate their ends by rivets 19. Although the number may be varied if desired, I have shown herein three of these members 17 disposed at equal distances from each other around the axial aperture. Also, it will be noted that each of the same is longitudinally grooved, as shown at 20, and has the inner end of its rivet 19 extending inward slightly beyond the inner surface of the bottom of its groove. As shown, each end of the members 17 is also provided with a laterally deflected portion 21 overlapping the edge of the axial aperture 18, while the portions 21 on the upper ends of the members 17 are slightly larger than those on the lower ends of the same, in order to prevent closing of the vents even if the member 5 is pressed tightly against the bottom of the bowl 2. It will also be noted that the rivets 19 which hold these members 17 in place, are so driven into the soft rubber material constituting the member 16, as to provide countersinks 22 in the exterior thereof and thus keep the outer ends of the rivets from coming in contact with the glass neck of the bowl 1.

Thus, it will be observed that vent means are provided along the axis of the stem permitting venting through the three members 17 at all times in such manner as also to expedite the flow between the bowls, while inhibiting the building up of pressure in the lower bowl. Moreover, it will be noted that at the same time the bowl 2 and its stem 4 are prevented from coming in contact with the bowl 1, and that the structure forms a unit adapted to grip the stem and be removed therewith and also readily withdrawn therefrom whenever desired, while the structure is also such as to permit ready cleaning of the member 5.

In the use of my improved construction, it will be understood that the parts are first assembled in the relation shown in Figure 1 prior to the coffee making operation. The ground coffee in the desired amount, and preferably in pulverized or in cornmeal grind form, is placed in the bowl 2 on top of the filter cloth 10. Then the desired amount of water in the form of boiling water, is poured into the bowl 2, and the cover placed on the latter if desired. The water passes down through the coffee and filter cloth 10 and apertures 9 in the disc 7, and into the enlarged space 8, and from it through the stem 4 into the bowl 1. When all of the coffee has thus passed into the latter bowl, the bowl 2 with its strainer mechanism 3 still connected thereto, and the combined washer and venting member 5 still on the stem 4, is lifted out bodily from the neck of the bowl 1. Then the coffee is ready to be served from the bowl 1, which forms a convenient dispensing or pouring bowl readily and conveniently handled by reason of its handle 6, while the neck of the bowl through which the coffee has passed in its passage to the bowl and in which the vents have also operated during the coffee making process, provides a very convenient pouring outlet.

As a result of my improved construction, it will be observed that while the cloth 10 effectively filters the coffee, it permits the same to pass freely therethrough, and that the apertures 9 in the disc 7 and the large chamber 8 beneath the disc also permit the coffee to flow freely from the bowl 2 into the stem 4. Moreover, it will be noted that by spacing the same substantially above the short stem, the flow of the liquid is further expedited, while the vent apertures further co-operate toward this end by providing constant communication with the atmosphere and preventing the formation of a seal tending to trap all the vapor in the lower bowl in such manner as to retard the free flow of the liquid. In practice, it is found that by reason of my improvement, it is possible to speed up the drip process very substantially, as compared with previous drip coffee makers, the same requiring only a normal infusion period of approximately four minutes with my improved construction, as compared with ten to fifteen minutes with other drip coffee makers. Further, the injurious elements in the pulverized or ground coffee, which are withdrawn therefrom by the longer infusion of the previous devices and accordingly incorporated in the beverage, remain in the grounds in my improved construction, and the coffee obtained is of markedly better quality. It is also hotter, due to the marked reduction in the time required for the coffee making process. Also, it will be noted that absorption of heat from the liquid is substantially reduced, as compared with the prior heavy pottery devices which absorb a far larger proportion of the heat in the liquid than does glass, in such manner as frequently to require the coffee to be reheated after the same is made, whereas when my improved construction is used, the coffee is still so hot as to be ready for immediate serving. Attention is further directed to the minimum of metal parts required and the resultant minimization of the objectionable flavoring of the coffee thereby. It will also be observed that only a few parts are required, and that these being largely glass, as in the case of the bowls, and porcelain, as in the case of the disc 7, are also easy to clean and not subject to stain and discoloration, while, of course, the filter cloth may be readily washed. These and other advantages of my improved construction will, however, be clearly apparent to those skilled in the art.

While I have in this application specifically described one embodiment which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:—

1. In a coffee maker, a lower bowl having a neck, and an upper bowl having a stem in said neck and also carrying strainer means, both said bowls having free communication with the atmosphere up through the neck of said lower bowl along the outside of said stem.

2. In a coffee maker, a lower dispensing bowl having a neck and an upper ground coffee and liquid receiving bowl having a stem in said neck and also carrying strainer means, both said bowls having free communication with the atmosphere up through the neck of the lower bowl along the outside of said stem, and said strainer means having means for effecting the transfer of the infused liquid to said lower bowl within a normal infusion period in said upper bowl.

3. In a coffee maker, a lower dispensing bowl having a neck and an upper ground coffee and liquid receiving bowl having a stem in said neck and also carrying strainer means, both said bowls having free communication with the atmosphere up through the neck of the lower bowl along the outside of said stem, and means extending into said stem and acting upon said strainer means for holding the latter in place while permitting flow through said stem.

4. In a coffee maker, a lower dispensing bowl having a neck and an upper ground coffee and liquid receiving bowl having a stem in said neck and also carrying strainer means, both said bowls having free communication with the atmosphere up through the neck of the lower bowl along the outside of said stem, said stem terminating above the normal liquid level in said lower bowl and said strainer means having holding means therefor extending through said stem to the lower end of the latter.

5. In a coffee maker, a lower bowl having a neck, an upper bowl having a stem thereon and communicating with said neck and also carrying strainer means, and means carried by said stem and seated in said neck and communicating with the atmosphere up through said neck and along the outside of said stem throughout the coffee making operation for establishing a free flow of liquid from the upper to the lower bowl.

6. In a coffee maker, a lower bowl having a neck, and an upper bowl having a stem in said neck and also carrying strainer means, said upper bowl having a short stem in the neck of the lower bowl and the latter also having vent means in its neck extending up along the outside of said stem.

7. In a coffee maker, a lower bowl having a neck, and an upper bowl having a stem in said neck and also carrying strainer means, said upper bowl having a short stem and having said strainer means spaced substantially above the top of said stem and apertured to permit a free flow of liquid therethrough, and said lower bowl also having vent means in its neck surrounding said stem.

8. In a coffee maker, a lower bowl having a neck, an upper bowl carrying strainer means and having a stem received in said neck, and a combined spacing member and vent carried on said stem and seated in said neck having constantly open vent means.

9. In a coffee maker, a lower bowl having a neck, an upper bowl carrying strainer means and having a stem received in said neck and disposed above any normal liquid level in the lower bowl, a spacing member surrounding said stem and seated in said neck, and constantly open vent means between said spacing member and said stem.

10. In a coffee maker, a lower bowl having a neck, an upper bowl carrying strainer means and having a stem received in said neck, a spacing member surrounding said stem and seated in said neck, constantly open vent members spaced around said stem, and means connecting said members to said spacing member out of contact with said neck.

11. In a coffee maker, a lower bowl having a neck, an upper bowl carrying strainer means and having a stem received in said neck and disposed above any normal liquid level in the lower bowl, a spacing member surrounding said stem and seated in said neck, and constantly open vent members engageable with said stem and having deflected ends at the ends of said spacing member.

12. In an upper bowl for drip coffee makers, a bowl member having a short stem on its bottom, strainer means engaging the bowl bottom substantially above the inlet of said stem and having passage means therein cooperating with said stem in promoting the free flow of liquid, and combined seating and venting means carried on the exterior of said stem and adapted to be received in the neck of a cooperating bowl.

13. A drip coffee maker comprising a bowl having a restricted neck, and cooperating drip coffee making means seated in said neck during the coffee making process and having the liquid delivered through said means into said bowl during said process constantly communicating with the atmosphere up through said neck and said drip coffee making means removable therefrom to permit pouring from said neck.

14. A drip coffee maker having a bowl having a restricted neck and cooperating drip coffee making means seated in said neck during the coffee making process and having the liquid delivered through said means into said bowl during said process constantly communicating with the atmosphere up through said neck and said drip coffee making means removable therefrom to permit pouring from said neck, said cooperating drip coffee making means including an upper ground coffee and liquid receiving bowl having a stem extending into said neck and strainer means for supplying an infusion in said upper bowl to said first mentioned bowl in a normal infusion period.

15. A drip coffee maker having a bowl having a restricted neck and cooperating drip coffee making means seated in said neck during the coffee making process and having the liquid delivered through said means into said bowl during said process constantly communicating with the atmosphere up through said neck and said drip coffee making means removable therefrom to permit pouring from said neck, said cooperating drip coffee making means including an upper ground coffee and liquid receiving bowl having strainer means therein and a stem and having said strainer means spaced substantially above the inlet of said stem and passage means through said strainer means for emptying said upper bowl of liquid in a normal infusion period.

16. A drip coffee maker comprising a bowl having a pouring neck, and cooperating drip coffee making means disposed in said neck during the coffee making process and constantly communicating with the atmosphere through said neck and removable therefrom to permit pouring from said neck, said drip coffee making means comprising a bowl having a short stem communicating with said first mentioned bowl through said neck, straining means in said second bowl, and seating and constantly open venting means between said stem and neck.

17. A combined connecting and venting member for coffee makers comprising a resilient member having its exterior receivable in a coffee maker neck and also having an axial bore, venting means distributed over the inner surface of said bore and spaced by sections of the wall of said bore, and means for connecting said venting means to said member.

18. A combined connecting and venting member for coffee makers comprising a resilient member having its exterior receivable in a coffee maker neck and also having an axial bore, venting means carried on the inner surface of said bore, and means for connecting said means to said member having their outer ends countersunk in the outer surface of said member.

19. A combined connecting and venting member for coffee makers comprising a resilient member having its exterior receivable in a coffee maker neck and also having an axial bore, and a plurality of vent members carried by said member disposed inside said bore and providing longitudinal passageways spaced by sections of the wall of said bore of said first mentioned member.

20. A combined connecting and venting member for coffee makers comprising a resilient member having its exterior receivable in a coffee maker neck and also having an axial bore, and a plurality of vent members carried by said member disposed inside said bore and having deflected ends projecting above the top of said bore.

21. A combined connecting and venting member for coffee makers comprising a resilient member having its exterior receivable in a coffee maker neck and also having an axial bore, a plurality of grooved vent members disposed inside said bore providing longitudinal passageways spaced by sections of the bore of said first mentioned member, and connecting means for said grooved members projecting into the grooves therein and countersunk in the outer surface of said first mentioned member.

22. In an upper bowl for coffee makers, a bowl having a stem on its bottom, strainer means engaging the bowl bottom above the inlet of said stem, resilient holding means for said strainer means having a portion hooked over the end of said stem, and releasing means operatively connected to said resilient means comprising an extension on said portion projecting toward the axis of said stem and extending closer to said axis than said hooked over portion and carrying a depending releasing member connected to said extension closer to said axis than said hooked over portion.

FRANK E. WOLCOTT.